United States Patent [19]
Spry

[11] 3,923,795
[45] Dec. 2, 1975

[54] 2-ALKOXYCEPHALOSPORINS

[75] Inventor: Douglas O. Spry, Indianapolis, Ind.

[73] Assignee: Eli Lilly and Company, Indianapolis, Ind.

[22] Filed: June 19, 1972

[21] Appl. No.: 263,907

[52] U.S. Cl............................. 260/243 C; 424/246
[51] Int. Cl.[2]....................................... C07D 501/20
[58] Field of Search ............................... 260/243 C

[56] References Cited
UNITED STATES PATENTS
3,507,861  4/1970  Morin et al. .................... 260/243 C
3,575,969  4/1971  Morin et al. .................... 260/243 C
3,578,660  5/1971  Cooper ........................... 260/243 C
3,660,395  5/1972  Wright ............................ 260/243 C Primary Examiner—Nicholas S. Rizzo
Attorney, Agent, or Firm—William C. Martens, Jr.; Everet F. Smith

[57] ABSTRACT

Novel 2-alkoxycephalosporins exhibit antibiotic activity and are prepared by reacting a cephalosporin or 2-methylcephalosporin in the presence of a $C_1$—$C_4$ alkanol with a reagent which is a source of positive halogen.

16 Claims, No Drawings

2-ALKOXYCEPHALOSPORINS

BACKGROUND OF THE INVENTION

Numerous cephalosporin compounds have been shown to have significant antibiotic activity, and much art has developed relating to various substituted cephalosporin substances. To date, however, only limited teaching exists with respect to a cephalosporin compound having a substituent in the 2-position. U.S. Pat. No. 3,578,660 teaches 2-acyloxycephalosporin compounds. U.S. Pat. Application Ser. No. 16,573, filed Mar. 4, 1970, now U.S. Pat. No. 3,660,396 teaches 2-methylene- and 2-methylcephalosporin compounds.

SUMMARY OF THE INVENTION

This invention is directed, in one part, to a process for converting a cephalosporin or a 2-methyl-cephalosporin to its corresponding 2-alkoxy-cephalosporin, which process comprises reacting the cephalosporin or 2-methyl-cephalosporin in the presence of a $C_1$-$C_4$ alkanol with a reagent which is a source of positive halogen.

In a preferred embodiment of this invention, the process comprises reacting a cephalosporin compound of the formula

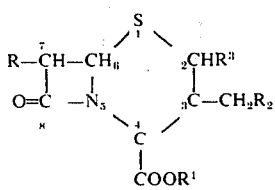

I in the presence of a $C_1$-$C_4$ alkanol with a reagent which is a source of positive halogen to produce a compound of the formula

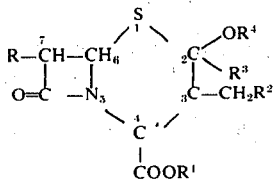

II in which, in the above formulae,

R is $H_2N$-; phthalimido; or an acylamido group;

$R^1$ is hydrogen or the residue of an ester group which is removable by saponification, hydrogenation or acid treatment;

$R^2$ is hydrogen;

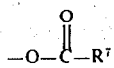

in which $R^7$ is hydrogen, $C_1$-$C_6$ alkyl, $C_5$-$C_7$ cycloalkyl, or

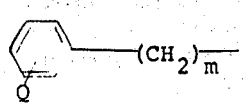

in which Q is as defined above and m is 0 or 1; or -O-$R^7$ in which $R^7$ is as defined above;

$R^3$ is hydrogen or methyl; and $R^4$ is $C_1$-$C_4$ alkyl.

In a more preferred embodiment of this invention, R in the above formulae is $H_2N$-; phthalimido;

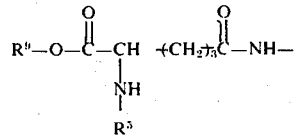

in which $R^9$ is hydrogen or any of the groups of $R^1$ as hereinbelow defined, and $R^5$ is hydrogen, t-butyloxycarbonyl, benzyloxycarbonyl, cyclopentyloxycarbonyl, or adamantyloxycarbonyl;

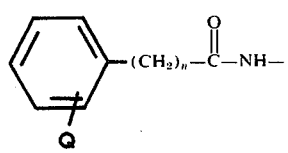

in which Q is hydrogen, $C_1$-$C_3$ alkyl, $C_1$-$C_3$ alkoxy, nitro, halogen, or trifluoromethyl, and n is o or an integer from 1 to 3;

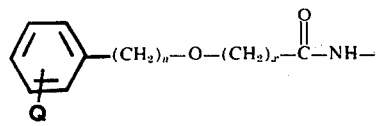

in which x is an integer from 1 to 3 and Q and n are as defined above;

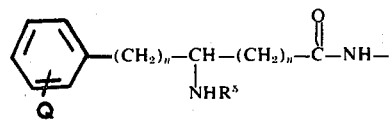

in which Q, n and $R^5$ are as defined above;

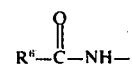

in which $R^6$ is hydrogen or $C_1$-$C_6$ alkyl; or

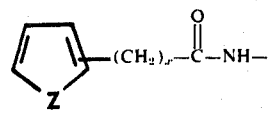

in which Z is oxygen or sulfur and x is as defined above.

In another more preferred embodiment of this invention, $R^1$ in the above formulae is hydrogen, $C_1$-$C_4$ alkyl, 2,2,2-trichloroethyl, benzyl, benzhydryl, p-methoxybenzyl, p-nitrobenzyl, or phthalimidomethyl.

The compounds of Formula II, depending upon the definition of $R^1$, are esters of free acids. When $R^1$ is an ester group, the compounds thereby defined are useful as intermediates which can be converted by standard procedures to the corresponding free acids. When $R^1$ is hydrogen, many of the compounds are useful as antibiotics and can be employed as such in numerous embodiments. The remaining compounds can be employed as intermediates from which, by cleavage of the 7-substituent and acylation of the resulting 7-amino derivative antibiotically active compounds can be prepared. The pharmaceutically acceptable salts of the antibiotically active compounds can also be used as antibiotics.

The novel compounds of Formula II, therefore, constitute another feature of this invention.

DETAILED DESCRIPTION OF THE INVENTION

Specific starting materials and products of the process of this invention are named, for convenience, by use of the "cepham" nomenclature system. "Penam" nomenclature for the penicillins is described by Sheehan, Henery-Logan, and Johnson in the Journal of the American Chemical Society, 75, 3292, footnote 2 (1953) and has been adapted to the cephalosporins by Morin, Jackson, Flynn, and Roeske (J. Am. Chem. Soc., 84, 3400 [1962]). In accordance with these systems of nomenclature, "cepham" refers to the following saturated ring system:

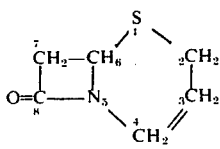

"Cephem" refers to the cepham ring structure containing a double bond, the position of which is indicated in any of several conventional systems. By one system, for example, the following representative starting material in accordance with this invention:

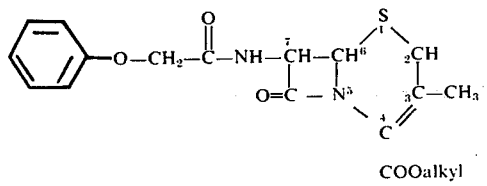

can be named alkyl 7-phenoxyacetamido-3-methyl-3-cephem-4-carboxylate. Other starting materials and products can be correspondingly named.

In the formulae employed herein, when $R^4$ is an alkyl group having three or four carbon atoms, such alkyl group can be either straight-chain or branched-chain alkyl. Typical alkyl groups within the definition of $R^4$ include methyl, ethyl, n-propyl, isopropyl, n-butyl, 2-methylpropyl, 1-methylpropyl, and t-butyl.

The group designated as R can be a free amino group or any protected amino group which is not itself reactive with the positive halogen reagent used in the process of this invention. Such protected amino groups are well known in the cephalosporin art. The protected amino group, for example, can be (triphenylmethyl)amino, phthalimido, or preferably, an acylamido group. Many acylamido groups suitable for this purpose are already known in the cephalosporin antibiotic literature. Preferred acylamido groups are those of the formula

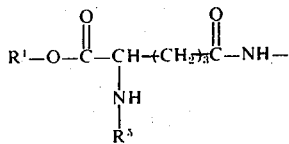

in which $R^1$ is hydrogen, $C_1$-$C_4$ alkyl, 2,2,2-trichloroethyl, benzyl, benzhydryl, p-methoxybenzyl, p-nitrobenzyl, or phthalimidomethyl, and $R^5$ is hydrogen, t-butyloxycarbonyl, benzyloxycarbonyl, cyclopentyloxycarbonyl, or adamantyloxycarbonyl. In the instance in which both $R^1$ and $R^5$ are hydrogen, the substituent which is thereby defined is that which is present in the commonly recognized cephalosporin C molecule. In the event that the 7-acyl function is to be cleaved to produce the nucleus compound, the nature of both $R^1$ and $R^5$ are not important.

Additional preferred acylamido functions are those having the formula

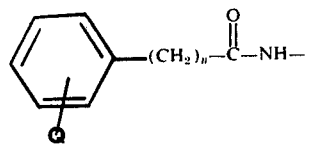

in which Q is hydrogen, $C_1$-$C_3$ alkyl, $C_1$-$C_3$ alkoxy, nitro, halogen, or trifluoromethyl, and n is 0 or an integer of from 1 to 3. A few representative examples of such acylamido groups include benzamido, phenylacetamido β-phenylpropionamido, γ-phenylbutyramido, (4-bromophenyl)acetamido, (4-tolyl)acetamido, (3-nitrophenyl)acetamido, (4-trifluoromethylphenyl)acetamido, (4-methoxyphenyl)acetamido and the like.

Other preferred acylamido functions are those having the formula:

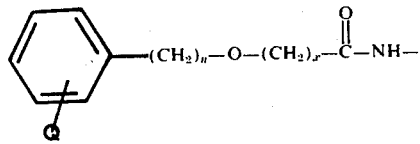

in which Q, n, and x are as defined above. A few representative examples of such acylamido groups include phenoxyacetamido, benzyloxyacetamido, β-(benzyloxy)propionamido, β-(phenoxy)propionamido, γ-(phenoxy)butyramido, 4-cumyloxy)acetamido, (3-fluorophenoxy)acetamido, (4-chlorophenoxy)acetamido, β-(2-chlorobenzyloxy)propionamido, (4-nitrophenoxy)acetamido, (2-phenylethoxy)acetamido, (3-phenylpropoxy)acetamido, (4-trifluoromethylphenoxy)-acetamido, β-(4-isopropoxybenzyloxy)propionamido, and the like.

Another group of preferred acylamido groups is defined by the formula

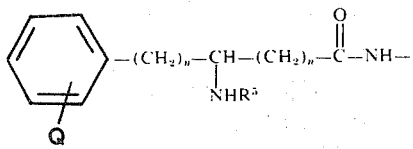

in which Q, n, and R⁵ are as defined above. A few representative examples of such acylamido groups include phenyl-α-aminoacetamido, 4-bromophenyl-α-aminoacetamido, 4-trifluoromethylphenyl-α-aminoacetamido, 4-methoxyphenyl-α-aminoacetamido, β-(2-chlorophenyl)-α-aminopropionamido, phenyl-α-(N-t-butyloxycarbonyl)aminoacetamido, phenyl-α-(N-benzyloxycarbonyl)aminoacetamido, phenyl-α-(N-cyclopentyloxycarbonyl)aminoacetamido, phenyl-α-(N-adamantyloxycarbonyl)aminoacetamido, 4-nitrophenyl-α-aminoacetamido, 4-tolyl-α-aminoacetamido, γ-phenyl-γ-aminobutyramido, δ-phenyl-δ-aminovaleramido, γ-phenyl-α-aminobutyramido, δ-phenyl-α-aminovaleramido, γ-phenyl-β-aminobutyramido, and the like.

Another group of preferred acylamido groups is defined by the formula

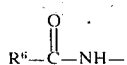

in which R⁶ is hydrogen or a $C_1$-$C_6$ alkyl. A few representative examples include formamido, acetamido, propionamido, butyramido, valeramido, and the like.

Another group of preferred acylamido functions is defined by the formula

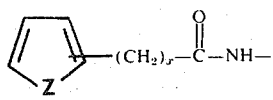

in which Z and x are as defined hereinabove. A few representative examples of such groups include 2-thienylacetamido, 3-thienylacetamido, β-(2-thienyl)propionamido, γ-(2-thienyl)butyramido, 2-furylacetamido, 3-furylacetamido, and the like.

Numerous other acylamido functions which can be used as R substituents in the 7-position are known in the prior penicillin and cephalosporin art; for example, those disclosed in Behrens et al., U.S. Pat. Nos. 2,479,295 to 2,479,297; and 2,562,407 to 2,562,411; and 2,623,876.

The R¹ group is hydrogen or the residue of an ester-forming alcohol, which residue is removable without degradation of the cephalosporin molecule. Removal of the ester function generally can be achieved by the use of trifluoroacetic acid, either alone or in the presence of a suitable solvent, such as benzene; or by the use of zinc dust in an alkanoic acid such as formic acid, acetic acid, or a mixture of such acids; or by any equivalent method whereby the cephalosporin molecule is not degraded. Preferred ester groups are $C_1$-$C_4$ alkyl, 2,2,2-trichloroethyl, benzyl, benzhydryl, p-methoxybenzyl, p-nitrobenzyl, and phthalimidomethyl.

The symbol R³ refers either to hydrogen or methyl. The typical cephalosporin nucleus as well as one having a methyl group in the 2-position can be employed as starting material in the process of this invention. In the instance in which R³ represents a methyl group, the cephalosporin starting materials thereby depicted are available from the teaching of copending United States application Ser. No. 16,573 filed Mar. 4, 1970.

The symbol R² defines substituents which provide in the 3-position of the cephalosporin nucleus a methyl or a substituted methyl group. When a methyl group is in the 3-position, R² is hydrogen. Those R² substituents which define a substituted methyl group can be represented by the formula

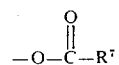

or by the formula $$-OR^7.$$

R⁷ in the above formulae is represented by hydrogen, $C_1$-$C_6$ alkyl, $C_5$-$C_7$ cycloalkyl, or

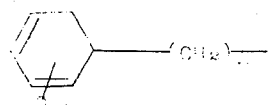

in which Q is $C_1$-$C_3$ alkyl, $C_1$-$C_3$ alkoxy, nitro, halogen, or trifluoromethyl, and m is 0 or 1, or 2. Illustrative of the groups thereby represented are formyloxy, acetoxy, propanoyloxy, butanoyloxy, pentanoyloxy, cyclopentanoyloxy, benzoyloxy, phenylacetoxy, p-methoxybenzoyloxy, 3-chlorophenylacetoxy, 4-nitrophenylacetoxy, hydroxy, methoxy, ethoxy, t-butyloxy, cyclopentyloxy, phenoxy, benzyloxy, p-methoxyphenoxy, p-nitrobenzyloxy, and the like.

Compounds having substituents in the 3-position such as those illustrated above can be prepared by known techniques from readily available compounds. For example, it is well recognized in the art that it is possible to convert a 3-methyl-3-cephem cephalosporin to its corresponding 3-substituted methyl derivative by converting the 3-methylcephalosporin to the corresponding 3-methyl-2-cephem compound. The 3-methyl-2-cephem compound is then brominated with N-bromosuccinimide to produce the corresponding 3-bromomethyl-2-cephem compound. The 3-bromomethyl-2-cephem compound is then oxidatively converted to the 3-bromomethyl-3-cephem-1-oxide, which is then reduced to the 3-bromomethyl-3-cephem cephalosporin compound. This derivative can then be reacted with a selected nucleophilic compound to produce the 3-substituted-methyl cephalosporins having substituents such as those described hereinabove.

The reaction of the cephalosporin with a reagent which is a source of positive halogen proceeds readily under a variety of reaction conditions. It is generally advisable in order to obtain good yields to carry out the reaction in the presence of a solvent. The choice of solvents is not critical, provided that the solvent is one which is compatible with the reagent which is the source of positive halogen. Suitable solvents include, therefore, ethers, esters, hydrocarbons, halogenated hydrocarbons, aliphatic nitriles or tertiary amides. Illustrative of these are diethyl ether, methyl ethyl ether, tetrahydrofuran, dioxane, dimethylformamide, dimethylacetamide, acetonitrile, propionitrile, diethylene glycol dimethyl ether, ethyl acetate, chloroform, dichlorobenzene, benzene, toluene, and the like.

The reaction proceeds over a wide range of temperatures. However, the lower the temperature the slower the reaction rate. Preferably, the reaction is carried out at a temperature of from about −15°C. to about +40°C., with a temperature in the range of from about room temperature to about +40°C. being especially preferred.

As indicated hereinabove, the reagent which is employed in the process of this invention is one which is a source of positive halogen. As used herein, the term "source of positive halogen" is intended to refer to and to include any source of $X^+$ in which X is chlorine or bromine. A wide variety of halogenating agents are known to those skilled in the art as supplying positive halogen, and any of these can be used in the practice of this invention. Representative of suitable halogenating agents are the elemental halogens, such as chlorine and bromine, sulfuryl chloride, sulfuryl bromide, N-halogeno amides and imides, such as N-chlorosuccinimide, N-bromosuccinimide, N,N'-dibromohydantoins, and organic hypohalides, particularly the alkanoyl hypohalides, such as acetyl hypochloride, propionyl hypochloride, butyryl hypochloride, acetyl hypobromide, propionyl hypobromide, butyryl hypobromide, and the like. Additionally, use can be made of a mixed halogen such as BrCl, ClI, BrI, and the like.

In the process of this invention, the cephalosporin and the source of positive halogen react in amounts representing equimolar proportions. In order to assure optimum conversion of the cephalosporin, it is preferred to employ an excess of the source of positive halogen, such as from about 1.1 to about 5.0 molar proportions of the source of positive halogen per molar proportion of the cephalosporin. More preferably, from about 1.1 to about 2 moles of the source of positive halogen is employed per mole of the cephalosporin.

Another essential reagent is the process of this invention is one which provides the alkoxy group which adds in the 2-position of the cephalosporin. An appropriate reagent for this purpose is one having the formula $R^4OH$ in which $R^4$ is a $C_1-C_4$ alkyl. The particular alkoxy group which is added to the 2-position of the cephalosporin will depend upon the structure of the alcohol which is employed. The amount of alcohol which is employed in this reaction is not critical, except that it be at least equal on an equimolar basis to the amount of the cephalosporin which is employed. Thus, it is possible to employ the selected alcohol both as reactant and as solvent, thereby using a large excess of the alcohol.

The time of reaction is in general quite rapid. Thus, the reaction is usually completed in a matter of minutes, and the useful time range generally is within from about five minutes to about four hours.

A typical preparation of the 2-alkoxycephalosporin in accordance with this invention involves mixing the cephalosporin having appropriate substituents in the 3-, 4-, and 7-positions in a suitable solvent containing the selected alcohol $R^4OH$ or in the selected alcohol itself along with an appropriate quantity of the source of positive halogen. The resulting reaction mixture is maintained for the desired reaction time, after which the product is isolated in accordance with known techniques.

The products prepared in accordance with the process of this invention are in general esters of cephalosporins, although the free acid itself can be directly produced. The esters can be deesterified to the corresponding free acid compounds in accordance with known techniques.

In addition to deesterification, the non-hydrogen moiety (should there be one) at the amino group in the 7-position can be removed according to known procedures to produce the corresponding 7-aminocephalosporin compound. This 7-aminocephalosporin can then be acylated with another acyl group to produce a different 7acylamidocephalospurin. The precise manner in which the removal and/or replacement of the acyl group is conducted is not critical. Such reactions are known in the penicillin and cephalosporin arts, attention being directed to U.S. Pat. Nos. 3,218,318 and 3,382,241.

The free acid compounds which can be obtained directly or by deesterification of the esters produced in accordance with the process of this invention are antibiotically active and can be employed either as such or in the form of pharmaceutically acceptable salts thereof. These compounds can be administered by a plurality of routes; however, they are preferably administered by intramuscular injection. Doses of from about 100 mg. to about 1 g. are usually employed.

The following examples are illustrative of the process of this invention as well as of the compounds available therefrom, and will enable those skilled in the art to practice this invention.

EXAMPLE I

To a stirred solution of 0.480 grams of 2,2,2-trichloroethyl 7-phenoxyacetamido-3-methyl-3-cephem-4-carboxylate (1.0 millimole) dissolved in 50 ml. of methanol was added 3.4 ml. of a methylene chloride solution containing 0.071 g. (1.0 millimole) of chlorine. The resulting mixture was stirred at room temperature for about one hour. The reaction mixture was then transferred to a separatory funnel using about 125 ml. of methylene chloride as rinsing medium. The mixture was washed successively with saturated aqueous sodium bicarbonate solution and aqueous sodium chloride solution. The resulting washed mixture was dried over sodium sulfate, filtered, and evaporated to produce 0.464 g. of a residue. The residue was then dissolved in a mixture of benzene and ethyl acetate and passed over a silica gel chromatographic column. 2,2,2-Trichloroethyl 7-phenoxyacetamido-2-methoxy-3-methyl-3-cephem-4-carboxylate (0.263 g.) was recovered.

Analysis: IR (CHCl$_3$) 3410, 1786, 1743, 1694, 1225, and 1083 cm.$^{-1}$; MS 508; NMR (CDCl$_3$) indicated the following delta (δ) values: 2.23 (s, 3H) vinylmethyl; 3.49 (s, 3H) methoxy; 4.59 (s, 2H) phenoxymethylene; 4.84 (s, 1H) proton at C$_2$; 4.8, 5.05 (AB J = 12.0, 2H) CH$_2$CCl$_3$; 5.16 (d, J = 5.0, 1H) proton at C$_6$; 6.00 (q, J = 5.0/9.5, 1H) proton at C$_7$.

Other products available in accordance with the procedure of Example I include:

p-Nitrobenzyl 7-phenoxyacetamido-2-methoxy-3-methyl-3-cephem-4-carboxylate from p-nitrobenzyl 7-phenoxyacetamido-3-methyl-3-cephem-4-carboxylate. Analysis of this product gave the following results: IR (CHCl$_3$) 1784, 1730, 1695, 1520, 1350, 1215, and 1080 cm.$^{-1}$; MS 513, 437; NMR (CDCl$_3$) indicated the following delta values: 2.19 (s, 3H) vinylmethyl; 3.47 (s, 3H) methoxy; 4.59 (s, 2H) phenoxymethylene; 4.82 (s, 1H) proton at C$_2$; 5.11 (d, J = 5.0, 1H) proton at C$_6$; 5.37 (s, 2H) p-nitrophenylmethylene; 5.95 (q, J = 9.0/5.0/.05, 1H) proton at C$_7$.

Analysis, Calc. for $C_{24}H_{23}N_3O_8S$: C, 56.13; H, 4.51; N, 8.18. Found: C, 55.93; H, 4.69; N, 8.21.

7-Phenoxyacetamido-2-methoxy-3-methyl-3-cephem-4-carboxylic acid from 7-phenoxyacetamido-3-methyl-3-cephem-4-carboxylic acid. NMR of this product shows a methoxyl and a β-lactam function.

p-Nitrobenzyl 7-amino-2-methoxy-3-methyl-3-cephem-4-carboxylate from p-nitrobenzyl 7-amino-3-methyl-3-cephem-4-carboxylate tosylate amine salt. Analysis: IR (CHCl$_3$) 1776 and 1080 cm.$^{-1}$. MS 379, 351, 323, 320. NMR indicated the following delta values: 2.17 (s, 3H) vinylmethyl; 3.50 (s, 3H) methoxy; 4.83 (s, 1H) proton at $C_2$; 4.83 (m) proton at $C_7$; 5.03 (d, 1H, J = 5.0 Hz) proton at $C_6$; 5.38 (s, 2H) p-nitrophenylmethylene; 7.62, 8.25 (AB, 4H, J = 8.5 Hz) p-nitrophenyl.

t-Butyl 7-amino-2-methoxy-3-acetoxymethyl-3-cephem-4-carboxylate from t-butyl 7-amino-3-acetoxymethyl-3-cephem-4-carboxylate. Analysis: IR (CHCl$_3$) 1783 and 1070 cm.$^{-1}$. NMR indicated the following delta values: 1.59 (s, 9H) t-butyl; 1.87 (s, 2H) NH$_2$; 2.10 (s, 3H) acetyl; 3.44 (s, 3H) methoxy; 4.85 (m, 5H) acetoxymethyl, proton at $C_2$, proton at $C_6$, and proton at $C_7$.

2,2,2-Trichloroethyl 7-(2-thienyl)acetamido-2-methoxy-3-acetoxymethyl-3-cephem-4-carboxylate from 2,2,2-trichloroethyl 7-(2-thienyl)acetamido-3-acetoxymethyl-3-cephem-4-carboxylate using 1.5 equivalents of chlorine per each equivalent of the cephalosporin. Analysis: IR 1793 and 1075 cm.$^{-1}$. MS 556, 496, 318. NMR indicated the following delta values: 2.08 (s, 3H) acetyl: 3.44 (s, 3H) methoxy; 3.84 (s, 2H) thienylmethylene; 5.0 (m, 6H) trichloroethyl, acetoxymethyl, proton at $C_2$, and proton at $C_6$; 6.08 (q, 1H, J = 4, 8) proton at $C_7$; 6.52 (d, 1H, J = 8)>NH.

2,2,2-Trichloroethyl 7-phenoxyacetamido-2-methoxy-3-acetoxymethyl-3-cephem-4-carboxylate from 2,2,2-trichloroethyl 7-phenoxyacetamido-3-acetoxymethyl-3-cephem-4-carboxylate. Analysis: IR (CHCl$_3$) 1792 and 1070 cm.$^{-1}$. NMR (CDCl$_3$) indicated the following delta values: 2.09 (s, 3.7H) acetyl, 3.37 (s, 3H) methoxy; 4.59 (s, 2H) phenoxymethylene; 5.0 (m, 6H) trichloroethyl, acetoxymethylene, proton at $C_2$, and proton at $C_6$; 6.06 (q, 1H, J = 9.0/5.0/1.0 Hz) proton at $C_7$.

2,2,2-Trichloroethyl 7-phenoxyacetamido-2,3-dimethyl-2-methoxy-3-cephem-4-carboxylate from 2,2,2-trichloroethyl 7-phenoxyacetamido-2,3-dimethyl-3-cephem-4-carboxylate. Analysis: IR (CHCl$_3$) 1785 cm.$^{-1}$. NMR(CDCl$_3$) indicated the following delta values: 1.85 (s, 3H) 2-methyl; 2.02 (s, 3H) vinylmethyl; 3.41 (s, 3H) methoxy, 4.56 (s, 2H) phenoxymethylene; 4.90 (2H) trichloroethyl; 5.04 (d, 1H, J = 4.0) proton at $C_6$; 5.80 (q, 1H, J = 4.0/9.0 Hz) proton at $C_7$.

Benzyl 7-(5'-amino-5'-carboxy)valeramido-2-methoxy-3-formyloxymethyl-3-cephem-4-carboxylate from benzyl 7-(5'-amino-5'-carboxy)valeramido-3-formyloxymethyl-3-cephem-4-carboxylate.

t-Butyl 7-phenylacetamido-2-methoxy-3-propanoyloxymethyl-3-cephem-4-carboxylate from t-butyl 7-phenylacetamido-3-propanoyloxymethyl-3-cephem-4-carboxylate.

Phthalimidomethyl 7-(α-phenyl-α-amino)acetamido-2-methoxy-3-phenylacetoxymethyl-3-cephem-4-carboxylate from phthalimidomethyl 7-(α-phenyl-α-amino)acetamido-3-phenylacetoxymethyl-3-cephem-4-carboxylate.

p-Nitrobenzyl 7-(α-phenyl-α-amino)acetamido-2-methoxy-3-acetoxymethyl-3-cephem-4-carboxylate from p-nitrobenzyl 7-(α-phenyl-α-amino)acetamido-3-acetoxymethyl-3-cephem-4-carboxylate.

2,2,2-Trichloroethyl 7-(α-amino-α-phenyl)acetamido-2-methoxy-3-methyl-3-cephem-4-carboxylate from 2,2,2-trichloroethyl 7-(α-amino-α-phenyl)acetamido-3-methyl-3-cephem-4-carboxylate.

p-Nitrobenzyl 7-(2-thienyl)acetamido-2-methoxy-3-acetoxymethyl-3-cephem-4-carboxylate from p-nitrobenzyl 7-(2-thienyl)acetamido-3-acetoxymethyl-3-cephem-4-carboxylate.

EXAMPLE II

To a stirred solution of 0.480 g. of 2,2,2-trichloroethyl 7-phenoxyacetamido-3-methyl-3-cephem-4-carboxylate (1.0 millimole) in 2 ml. of methylene chloride and 50 ml. of ethanol was added dropwise over a five-minute period 0.017 g. (1 millimole) of chlorine dissolved in methylene chloride. The resulting mixture was stirred at room temperature for about one hour. The mixture was then transferred to a separatory funnel using methylene chloride as a rinse. The mixture was then washed successively with aqueous sodium chloride solution, aqueous sodium bicarbonate solution, and aqueous sodium chloride solution. The mixture was then dried over sodium sulfate, filtered, and evaporated to produce a residue of 0.467 g. of solid. The residue was dissolved in a mixture of benzene and ethyl acetate and passed over a chromatographic column containing silica gel. 2,2,2-Trichloroethyl 7-phenoxyacetamido-2-ethoxy-3-methyl-3-cephem-4-carboxylate was recovered as product.

Analysis: NMR (CDCl$_3$) indicated the following delta values: 1.26 (t, 3H), J = 7.0 Hz) ethoxy; 2.23 (s, 3H) vinylmethyl; 3.7 (m) ethoxy; 4.59 (s, 2H) phenoxymethylene; 4.59, 5.03 (AB, J = 12.0 Hz, 2H) CH$_2$CCl$_3$; 4.94 (s, 1H) proton at $C_2$; 5.19 (d, 1H, J = 4.5/9.0/0.5 Hz) proton at $C_6$; 6.0 (q, 1H) proton at $C_7$.

Using the procedure of Example II, other compounds are available as follows:

p-Nitrobenzyl 7-phenoxyacetamido-2-ethoxy-3-methyl-3-cephem-4-carboxylate from p-nitrobenzyl 7-phenoxyacetamido-3-methyl-3-cephem-4-carboxylate. Analysis: IR (CHCl$_3$) 1782 and 1065 cm.$^{-1}$; NMR (CDCl$_3$) analysis produced the following delta values: 1.25 (t, 3H, J = 7.0 Hz) ethoxy; 2.20 (s, 3H) vinylmethyl; 3.7 (m) ethoxy; 4.55 (s, 2H) phenoxymethylene; 4.87 (s, 1H) proton at $C_2$; 5.10 (d, 1H, J = 4.0) proton at $C_6$; 5.30 (s, 2H) p-nitrophenylmethylene; 5.90 (q, 1H, J = 9.0/4.0) proton at $C_7$.

2,2,2-Trichloroethyl 7-(2-thienyl)acetamido-2-ethoxy-3-acetoxymethyl-3-cephem-4-carboxylate from 2,2,2-trichloroethyl 7-(2-thienyl)acetamido-3-acetoxymethyl-3-cephem-4-carboxylate. Analysis: IR (CHCl$_3$) 1795 cm.$^{-1}$; MS 570, 510; NMR (CDCl$_3$) analysis produced the following delta values: 1.22 (t, 3H, J = 7.0 Hz) ethoxy; 2.03 (s, 3H) vinylmethyl; 3.7 (m, 2H) ethoxy; 3.80 (s, 2H) thienylmethylene; 5.0 (m, 6H) trichloroethyl, acetoxymethyl, proton at $C_2$ and proton at $C_6$; 5.83 (q, 1H, J = 4.5/9.0 Hz) proton at $C_7$.

Benzhydryl 7-formamido-2-ethoxy-3-hydroxymethyl-3-cephem-4-carboxylate from benzhydryl 7-formamido-3-hydroxymethyl-3-cephem-4-carboxylate.

p-Methoxybenzyl 7-(α-amino-α-phenyl)acetamido-2-ethoxy-3-methyl-3-cephem-4-carboxylate from p-methoxybenzyl 7-(α-amino-α-phenyl)acetamido-3-methyl-3-cephem-4-carboxylate.

Benzyl 7-(4-hydroxyphenyl)acetamido-2-ethoxy-3-benzoyloxymethyl-3-cephem-4-carboxylate from benzyl 7-(4-hydroxyphenyl)acetamido-3-benzoyloxymethyl-3-cephem-4-carboxylate.

2,2,2-Trichloroethyl 7-(4-methoxyphenoxy)acetamido-2-ethoxy-3-t-butoxymethyl-3-cephem-4-carboxylate from 2,2,2-trichloroethyl 7-(4-methoxyphenoxy)acetamido-3-t-butoxymethyl-3-cephem-4-carboxylate.

EXAMPLE III

To a stirred solution of 0.480 g. of 2,2,2-trichloroethyl 7-phenoxyacetamido-3-methyl-3-cephem-4-carboxylate (1.0 millimole) dissolved in a mixture of 2 ml. of methylene chloride and 50 ml. of isopropyl alcohol was added dropwise over a five-minute period 0.071 g. (1.0 millimole) of chlorine dissolved in methylene chloride. The resulting mixture was allowed to stir at room temperature for about one hour. The reaction mixture was then transferred to a separatory funnel using additional methylene chloride as a rinsing medium. The mixture was then washed successively with aqueous sodium chloride solution, aqueous sodium bicarbonate solution, and aqueous sodium chloride solution. The mixture was then dried over sodium sulfate, filtered, and evaporated to produce 0.456 mg. of a solid residue. The residue was dissolved in a mixture of benzene and ethyl acetate and passed over a chromatographic column containing silica gel. 2,2,2-Trichloroethyl 7-phenoxyacetamido-2-isopropoxy-3-methyl-3-cephem-4-carboxylate was recovered. NMR (CDCl$_3$) indicated the following delta values: 1.23 (d, 6H, J = 6.0 Hz) two methyls on isopropyl; 2.20 (s, 3H) vinylmethyl; 4.06 (m, 1H, J = 6.0 Hz) proton on isopropyl; 4.58 (s, 2H) phenoxymethylene; 4.84, 5,03 (AB, 2H, J = 12.0 Hz) trichloroethyl; 5.01 (s, 1H) proton at C$_2$; 5.21 (d, 1H, J = 4.5 Hz) proton at C$_6$; 6.02 (q, 1H, J = 4.5/9.0 Hz) proton at C$_7$.

Other compounds available in accordance with the procedure of Example III are as follows:

p-Nitrobenzyl 7-phenoxyacetamido-2-isopropoxy-3-methyl-3-cephem-4-carboxylate from p-nitrobenzyl 7-phenoxyacetamido-3-methyl-3-cephem-4-carboxylate. Analysis: IR (CHCl$_3$) 1784 cm.$^{-1}$; MS 541, 360; NMR (CDCl$_3$) indicated the following delta values: 1.21 (d, 6H, J = 6.0 Hz) two methyls on isopropyl; 2.16 (s, 3H) vinylmethyl; 4.05 (m, 1H, J = 6.0 Hz) proton on isopropyl; 4.58 (s, 2H) phenoxymethylene; 5.00 (s, 1H) proton at C$_2$; 5.18 (d, 1H, J = 5.0 Hz) proton at C$_6$; 5.47 (s, 2H) p-nitrophenylmethylene; 5.98 (q, 1H, J = 5.0/9.0) proton at C$_7$.

p-Nitrobenzyl 7-(α-amino-α-phenyl)acetamido-2-isopropoxy-3-acetoxymethyl-3-cephem-4-carboxylate from p-nitrobenzyl 7-(α-amino-α-phenyl)acetamido-3-acetoxymethyl-3-cephem-4-carboxylate.

Benzhydryl 7-amino-2-isopropoxy-3-methoxymethyl-3-cephem-4-carboxylate from benzhydryl 7-amino-3-methoxymethyl-3-cephem-4-carboxylate.

p-Methoxybenzyl 7-(α-phenyl)propionamido-2-isopropoxy-3-ethoxymethyl-3-cephem-4-carboxylate from p-methoxybenzyl 7-(α-phenyl)propionamido-3-ethoxymethyl-3-cephem-4-carboxylate.

EXAMPLE IV

To a stirred solution of 4.83 g. (0.01 mole) of p-nitrobenzyl 7-phenoxyacetamido-3-methyl-3-cephem-4-carboxylate dissolved in a mixture of 120 ml. of methylene chloride and 120 ml. of t-butyl alcohol was added dropwise over a ten-minute period 39 ml. of a methylene chloride solution containing 1.07 g. (0.015 mole) of chlorine. The resulting mixture was stirred at room temperature for about thirty minutes. The mixture was then transferred to a sepratory funnel using additional methylene chloride as rinsing medium. The mixture was then washed successively with aqueous sodium bicarbonate and aqueous sodium chloride. The mixture was then dried over sodium sulfate, filtered, and evaporated to a yellow residue. The residue was then dissolved in a mixture of benzene and ethyl acetate and passed over a chromatograph column containing silica gel. Elution using a benzene-ethyl acetate gradient produced 0.905 g. of p-nitrobenzyl 7-phenoxyacetamido-2-t-butoxy-3-methyl-3-cephem-4-carboxylate and 1.817 g. of p-nitrobenzyl 7-phenoxyacetamido-1-oxide-3-methyl-3-cephem-4-carboxylate.

Analysis of the 2-t-butoxy compound: IR (CHCl$_3$) 1784, 1046, and 1023 cm.$^{-1}$; MS 555, 452; NMR (CDCl$_3$) indicated the following delta values: 1.32 (s, 9H) t-butyl; 2.13 (s, 3H) vinylmethyl; 4.57 (s, 2H) phenoxymethylene; 5.16 (s, 1H) proton at C$_2$; 5.27 (d, 1H, J = 5.0 Hz) proton at C$_6$; 5.36 (s, 2H) p-nitrophenylmethylene; 6.0 (q, 1H, J = 5.0/9.0/0.5) proton at C$_7$.

Other compounds available in accordance with the procedure of Example IV are as follows:

p-Nitrobenzyl 7-(α-amino-α-phenyl)acetamido-2-t-butoxy-3-methyl-3-cephem-4-carboxylate from p-nitrobenzyl 7-(α-amino-α-phenyl)acetamido-3-methyl-3-cephem-4-carboxylate.

2,2,2-Trichloroethyl 7-(2-thienyl)acetamido-2-t-butoxy-3-acetoxymethyl-3-cephem-4-carboxylate from 2,2,2-trichloroethyl 7-(2-thienyl)acetamido-3-acetoxymethyl-3-cephem-4-carboxylate.

Phthalimidomethyl 7-(β-benzyloxy)propionamido-2-t-butoxy-3-(4-methoxybenzoyloxy)methyl-3-cephem-4-carboxylate from phthalimidomethyl 7-(β-benzyloxy)propionamido-3-(4-methoxybenzoyloxy)methyl-3-cephem-4-carboxylate.

EXAMPLE V

To a stirred solution of 0.354 g. of p-nitrobenzyl 7-amino-2-methoxy-3-methyl-3-cephem-4-carboxylate (0.94 millimole) in 30 ml. of acetone was added 30 ml. of water followed by 0.118 g. of sodium bicarbonate. 2-Thiopheneacetyl chloride (0.226 g.) was then added and the reaction mixture was allowed to stir at room temperature for about 1 hour. The acetone was then evaporated from the reaction mixture, and the residue was extracted with ethyl acetate. The ethyl acetate extract was washed successively with aqueous sodium bicarbonate, dilute HCl, aqueous sodium bicarbonate and aqueous sodium chloride. The ethyl acetate extract was then dried over sodium sulfate, filtered, and evaporated to 0.418 g. of residue product. Recrystallization of the residue from a mixture of methylene chloride and hexane gave white needles of p-nitrobenzyl 7-(2-thienyl)acetamido-2-methoxy-3-methyl-3-cephem-4-carboxylate, m.p., 173°–4°C.

Analysis: IR (CHCl$_3$) 1785 cm.$^{-1}$; MS 504; NMR (CDCl$_3$/DMSO) indicated the following delta values: 2.19 (s, 3H) vinylmethyl; 3.50 (s, 3H) methoxy; 3.87 (s, 2H) thiophenemethylene; 5.03 (s, 1H) proton at C$_2$; 5.10 (d, 1H, J = 4.5 Hz) proton at C$_6$; 5.86 (q, 1H, J = 8.0/4.5/0.5 Hz) proton at C$_7$.

Analysis, Calc for $C_{22}H_{21}N_3O_7S_2$: C, 52.48; H, 4.20; N, 8.34. Found: C, 52.19; H, 4.40; N, 8.04.

Other compounds which are available in accordance with the procedure of Example V are as follows:

t-Butyl 7-(2-thienyl)acetamido-2-methoxy-3-acetoxymethyl-3-cephem-4-carboxylate from t-butyl 7-amino-2-methoxy-3-acetoxymethyl-3-cephem-4-carboxylate. Analysis: IR (CHCl$_3$) 1785 and 1071 cm.$^{-1}$; NMR (CDCl$_3$) indicated the following delta values: 1.56 (s, 9H) t-butyl; 2.10 (s, 3H) acetyl; 3.44 (s, 3H) methoxy; 3,86 (s, 2H) thiophenemethylene; 5.0 (m, 4H) acetoxymethylene, proton at C$_2$, and proton at C$_6$; 5.90 (q, 1H, J = 4/9 Hz) proton at C$_7$; 6.78 (d, 1H, J = 9)>NH.

Benzyl 7-(4-methoxyphenyl)acetamido-2-ethoxy-3-acetoxymethyl-3-cephem-4-carboxylate from benzyl 7-amino-2-ethoxy-3-acetoxymethyl-3-cephem-4-carboxylate.

Benzhydryl 7-($\alpha$-amino-$\alpha$-phenyl)acetamido-2-methoxy-3-methyl-3-cephem-4-carboxylate from benzhydryl 7-amino-2-methoxy-3-methyl-3-cephem-4-carboxylate.

EXAMPLE VI p-Nitrobenzyl 7-phenoxyacetamido-2-isopropoxy-3-methyl-3-cephem-4-carboxylate (0.100 g.) was dissolved in 70 ml. of methanol. This solution was added to 30 ml. of ethanol containing 0.100 g. of 5 percent palladium on carbon which had been pre-reduced for fifteen minutes under a hydrogen pressure of 50 psig. The resulting mixture was hydrogenated at room temperature and at a hydrogen pressure of 50 psig. for about 2 hours. The reaction mixture was then filtered to remove catalyst, the filtrate was evaporated to dryness, and the residue was dissolved in chloroform. The resulting solution was then filtered through Celite, and the filtrate was evaporated to a solid residue of 0.076 g. The residue was then dissolved in ethyl acetate, and the ethyl acetate solution was extracted with aqueous sodium bicarbonate. The aqueous layer was separated from the organic, and ethyl acetate was added to the mixture. The mixture was then made acid by addition of 1N HCl. The ethyl acetate layer was then separated from the aqueous, washed with aqueous sodium chloride, dried over sodium sulfate, filtered, and evaporated to produce 64 mg. of 7-phenoxyacetamido-2-isopropoxy-3-methyl-3-cephem-4-carboxylic acid. NMR (CDCl$_3$) indicated the following delta values: 1.20 (d, 6H, J = 6.0 Hz) methyls on isopropyl; 2.16 (s, 3H) vinylmethyl; 4.0 (m, 1H, J = 6.0) proton on isopropyl; 4.56 (s, 2H) phenoxymethylene; 4.95 (s, 1H) proton at C$_2$; 5.12 (d, 1H) J = 5.0 Hz) proton at C$_6$; 5.92 (q, 1H, J = 5.0/9.0 Hz) proton at C$_7$.

Other products available in accordance with the procedure of Example VI are as follows:

7-Phenoxyacetamido-2-methoxy-3-methyl-3-cephem-4-carboxylic acid from p-nitrobenzyl 7-phenoxyacetamido-2-methoxy-3-methyl-3-cephem-4-carboxylate. Analysis: IR (CHCl$_3$) 1782 cm.$^{-1}$; MS 360, 314, 267; NMR (CDCl$_3$) indicated the following delta values: 2.23 (s, 3H) vinylmethyl; 3.46 (s, 3H) methoxy; 4.62 (s, 2H) phenoxymethylene; 4.79 (s, 1H) proton at C$_2$; 5.06 (d, 1H, J = 4.0 Hz) proton at C$_6$; 5.92 (q, 1H, J = 4.0/9.0) proton at C$_7$.

7-Phenoxyacetamido-2-ethoxy-3-methyl-3-cephem-4-carboxylic acid from p-nitrobenzyl 7-phenoxyacetamido-2-ethoxy-3-methyl-3-cephem-4-carboxylate. NMR (CDCl$_3$) indicated the following delta values: 1.26 (t, 3H, J = 7.0 Hz) methyl of ethoxy; 2.23 (s, 3H) vinylmethyl; 3.7 (m) methylene of ethoxy; 4.60 (s, 2H) phenoxymethylene; 4.90 (s, 1H) proton at C$_2$; 5.13 (d, 1H, J = 4.0 Hz) proton at C$_6$; 5.90 (q, 1H, J = 4.0/9.0 Hz) proton at C$_7$.

7-Phenoxyacetamido-2-t-butoxy-3-methyl-3-cephem-4-carboxylic acid from p-nitrobenzyl 7-phenoxyacetamido-2-t-butoxy-3-methyl-3-cephem-4-carboxylate. NMR (CDCl$_3$) indicated the following delta values: 1.32 (s, 9H) t-butyl; 2.17 (s, 3H) vinylmethyl; 4.57 (s, 2H) phenoxymethylene; 5.10 (s, 1H) proton at C$_2$; 5.20 (d, 1H, J = 4 Hz) proton at C$_6$; 5.9 (q, 1H, J = 4/8) proton at C$_7$.

7-(2-Thienyl) acetamido-2-methoxy-3-methyl-3-cephem-4-carboxylic acid from p-nitrobenzyl 7-(2-thienyl)acetamido-2-methoxy-3-methyl-3-cephem-4-carboxylate. Analysis: IR (CHCl$_3$) 1775 cm.$^{-1}$; MS 350; NMR (CDCl$_3$) indicated the following delta values: 2.12 (s) vinylmethyl; 3.40 (s) methoxy; 3.74 (s) thiophenemethylene 4.63, proton at C$_2$; 4.90, proton at C$_6$; 5.80, proton at C$_7$.

EXAMPLE VII

To a cooled (5°C.) and stirred solution of 0.270 g. of 2,2,2-trichloroethyl 7-(2-thienyl)acetamido-2-methoxy-3-acetoxymethyl-3-cephem-4-carboxylate dissolved in a mixture of 20 ml. of dimethylformamide and 3 ml. of glacial acetic acid was added 0.270 g. of zinc dust. The mixture was allowed to stir with cooling for about 1 hour. The mixture was then filtered to remove the zinc dust, and the zinc dust was washed with ethyl acetate which was added to the filtrate. The mixture was then transferred to a separatory funnel and extracted with saturated aqueous sodium bicarbonate. The aqueous sodium bicarbonate layer was separated from the organic layer, and ethyl acetate was added to the aqueous layer. The mixture was made acid by addition of 1N HCl. The ethyl acetate was separated from the acidified aqueous layer, and the aqueous layer was further extracted with additional ethyl acetate. The combined ethyl acetate extracts were then washed with aqueous sodium chloride, dried over sodium sulfate, and evaporated to produce 7-(2-thienyl)acetamido-2-methoxy-3-acetoxymethyl-3-cephem-4-carboxylic acid. NMR (CDCl$_3$) indicated the following delta values: 2.01 (s) vinylmethyl; 3.38 (s) methoxy; 3.86 (s) thiophenemethylene; 5.92 (q, J = 5/8 Hz) proton at C$_7$.

Other compounds which are available by the procedure of Example VII are as follows:

7-(2-Thienyl)acetamido-2-ethoxy-3-acetoxymethyl-3-cephem-4-carboxylic acid from 2,2,2-trichloroethyl 7-(2-thienyl)acetamido-2-ethoxy-3-acetoxymethyl-3-cephem-4-carboxylate. NMR (CDCl$_3$) indicated the following delta values: 1.24 (t, 3H) methyl of ethoxy; 2.09 (s, 3H) acetoxy; 3.85 (m) thiophenemethylene, and methylene of ethoxy; 5.0 (m, 4H) acetoxymethyl, proton at C$_2$, and proton at C$_6$; 5.85 (m, 1H) proton at C$_7$.

7-Phenoxyacetamido-2-methoxy-3-acetoxymethyl-3-cephem-4-carboxylic acid from 2,2,2-trichloroethyl 7-phenoxyacetamido-2-methoxy-3-acetoxymethyl-3-cephem-4-carboxylate. NMR (CDCl$_3$) indicated the following delta values: 2.10 (s) acetoxy; 3.44 (s) methoxy; 5.5 (m) acetoxymethyl, proton at C$_2$, and proton at C$_6$; 6.0 (m) proton at C$_7$.

In the following table, results are presented demonstrating the antibiotic activity of representative free acid compounds of this invention. The results are obtained by the standard paper disc diffusion assay method.

TABLE
Activity Data

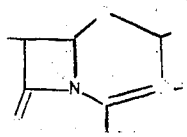

| Organism | Compound[a] (2 mg./ml.; 6 mg./ml.) | | | | | | | | | | | | | | | |
|---|---|---|---|---|---|---|---|---|---|---|---|---|---|---|---|---|
| | 1 | | 2 | | 3[b] | | 4[c] | | 5 | | 6 | | 7 | | 8 | |
| Staphylococcus aureus | 23 | 26 | 17 | 20 | Tr | 13 | 25 | 28 | 19 | 24 | 30 | 31 | 29 | 33 | 34 | 35 |
| Bacillus subtilis | 28 | 30 | 23 | 27 | 16 | 21 | 27 | 31 | 30 | 34 | 38 | 43 | 33 | 38 | 40 | 45 |
| Sarcina lutea | 21 | 25 | 17 | 23 | Tr | 11 | 24 | 29 | 22 | 26 | 35 | 38 | 34 | 38 | 31 | 35 |
| Mycobacterium avium | — | — | — | — | — | — | — | — | — | 12 | Tr | 17 | 11 | 14 | — | — |
| Trichophyton mentagraphytes | — | — | — | — | — | — | 12 | 16 | — | — | — | — | — | — | — | — |
| Proteus vulgaris | — | 13 | — | — | — | — | 11 | 14 | 14 | 17 | 24 | 29 | 20 | 22 | 17 | 24 |
| Salmonella gallinarum | — | — | — | — | — | — | — | — | — | — | 21 | 23 | 15 | 17 | — | — |
| Escherichia coli | — | — | — | — | — | — | — | — | Tr | 13 | 25 | 27 | 19 | 24 | 19 | 26 |
| Klebsiella pneumoniae | — | — | — | — | — | — | — | 11 | 13 | 15 | 21 | 23 | 16 | 20 | 16 | 23 |
| Pseudomonas solanacearum | — | — | — | — | — | — | — | — | — | — | Tr | 16 | — | — | — | — |

Footnotes
a. 1 - 7-phenoxyacetamido-2-methoxy-3-methyl-3-cephem-4-carboxylic acid.
2 - 7-phenoxyacetamido-2-ethoxy-3-methyl-3-cephem-4-carboxylic acid.
3 - 7-phenoxyacetamido-2-isopropoxy-3-methyl-3-cephem-4-carboxylic acid.
4 - 7-phenoxyacetamido-2-t-butoxy-3-methyl-3-cephem-4-carboxylic acid.
5 - 7-(2-thienyl)acetamido-2-methoxy-3-methyl-3-cephem-4-carboxylic acid.
6 - 7-(2-thienyl)acetamido-2-methoxy-3-acetoxymethyl-3-cephem-4-carboxylic acid.
7 - 7-(2-thienyl)acetamido-2-ethoxy-3-acetoxymethyl-3-cephem-4-carboxylic acid.
8 - 7-phenoxyacetamido-2-methoxy-3-acetoxymethyl-3-cephem-4-carboxylic acid.
b. - Run at 2 and 5 mg/ml, respectively.
c. - Run at 4 and 12 mg/ml, respectively.

I claim:
1. A process for converting a cephalosporin or a 2-methylcephalosporin of the formula

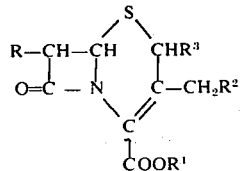

to its corresponding 2-alkoxycephalosporin of the formula

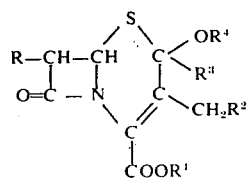

in which, in the above formulae,
R is $H_2N-$; phthalimido;

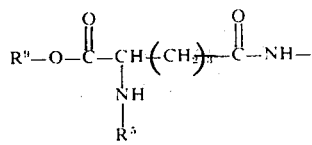

in which $R^9$ is hydrogen or any of the groups of $R^1$ as hereinbelow defined and $R^5$ is hydrogen, t-butyloxycarbonyl, benzyloxycarbonyl cyclopentyloxycarbonyl, or adamantyloxycarbonyl;

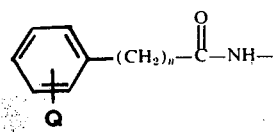

in which Q is hydrogen, $C_1$-$C_3$ alkyl, $C_1$-$C_3$ alkoxy, nitro, hydrogen, or trifluoromethyl, and $n$ is 0 or an integer from 1 to 3;

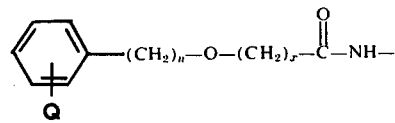

in which $x$ is an integer from 1 to 3 and Q and $n$ are as defined above;

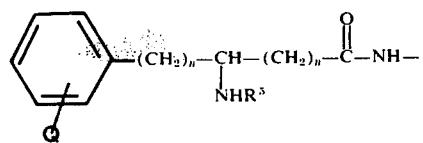

in which Q, $n$ and $R^5$ are as defined above;

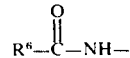

in which $R^6$ is hydrogen or $C_1$-$C_6$ alkyl; or

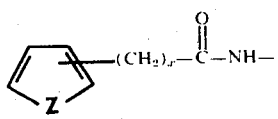

in which Z is oxygen or sulfur and $x$ is as defined above;

$R^1$ is hydrogen or the residue of an ester group which is removable by saponification, hydrogenation or acid treatment;

$R^2$ is hydrogen;

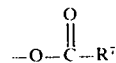

in which $R^7$ is hydrogen, $C_1$-$C_6$ alkyl, $C_5$-$C_7$ cycloalkyl, or

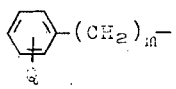

in which Q is hydrogen, $C_1$-$C_3$ alkyl, $C_1$-$C_3$ alkoxy, nitro, halogen, or trifluoromethyl, and m is 0 or 1, or —O—$R^7$ in which $R^7$ is as defined above;

$R^3$ is hydrogen or methyl; and $R_4$ is $C_1$-$C_4$ alkyl, which comprises reacting said cephalosporin or 2-methylcephalosporin in the presence of a $C_1$-$C_4$ alcohol with a source of positive halogen selected from the group consisting of chlorine, bromine, sulfuryl chloride, sulfuryl bromide, and N-halogeno amide or imide, and an organic hypohalide.

2. Process of claim 1, in which $R^1$ is hydrogen, $C_1$-$C_4$ alkyl, 2,2,2-trichloroethyl, benzyl, benzhydryl, p-methoxybenzyl, p-nitrobenzyl, or phthalimidomethyl.

3. Process of claim 2, which comprises using chlorine as the source of positive halogen.

4. Process of claim 3, in which the $C_1$-$C_4$ alcohol is methanol, ethanol, isopropyl alcohol, or t-butyl alcohol.

5. Process of claim 4, in which the reaction is carried out at a temperature of from about −15°C. to about +40°C.

6. A compound of the formula

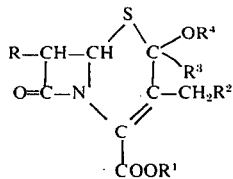

in which R is $H_2N$-; phthalimido;

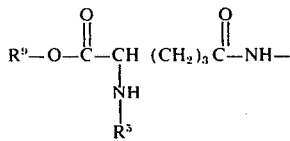

in which $R^9$ is hydrogen or any of the groups of $R^1$ as hereinbelow defined, and $R^5$ is hydrogen, t-butyloxycarbonyl, benzyloxycarbonyl, cyclopentyloxycarbonyl, or adamantyloxycarbonyl;

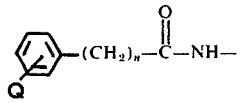

in which Q is hydrogen, $C_1$-$C_3$ alkyl, $C_1$-$C_3$ alkoxy, nitro, hydrogen, or trifluoromethyl, and n is 0 or an integer from 1 to 3;

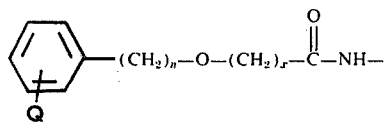

in which x is an integer from 1 to 3 and Q and n are as defined above;

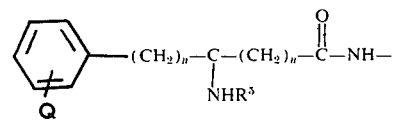

in which Q, n and $R^5$ are as defined above;

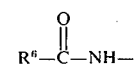

in which $R^6$ is hydrogen or $C_1$-$C_6$ alkyl; or

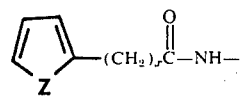

in which Z is oxygen or sulfur and x is as defined above;

$R^1$ is hydrogen, $C_1$-$C_4$ alkyl, 2,2,2-trichloroethyl, benzyl, benzhydryl, p-methoxybenzyl, p-nitrobenzyl, or phthalimidomethyl;

$R^2$ is hydrogen;

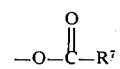

in which $R^7$ is hydrogen, $C_1$-$C_6$ alkyl, $C_5$-$C_7$ cycloalkyl,

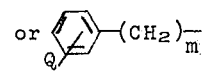

in which Q is hydrogen, $C_1$-$C_3$ alkyl, $C_1$-$C_3$ alkoxy, nitro, halogen, or trifluoromethyl; and m is 0 or 1; or -O-$R^7$ in which $R^7$ is as defined above;

$R^3$ is hydrogen or methyl; and $R^4$ is $C_1$-$C_4$ alkyl.

7. Compound of claim 6, in which $R^3$ is hydrogen and $R^2$ is hydrogen or acetoxy.

8. Compound of claim 7, in which $R^4$ is methyl, ethyl, isopropyl, or t-butyl.

9. Compound of claim 8, in which $R^1$ is hydrogen, p-nitrobenzyl, or 2,2,2-trichloroethyl.

10. Compound of claim 9, in which R is 2-thienylacetamido.

11. Compound of claim 9, in which R is α-phenyl-α-aminoacetamido.

12. Compound of claim 9, in which R is phenoxyacetamido.

13. Process of claim 2, in which $R^1$ is hydrogen or $C_1$-$C_4$ alkyl.

14. Process of claim 13, in which R is 2-thienylacetamido, $R^1$ is hydrogen, $R^2$ is acetoxy, $R^3$ is hydrogen, and $R^4$ is methyl.

15. Compound of claim 6, in which $R^1$ is hydrogen or $C_1$-$C_4$ alkyl.

16. Compound of claim 15, in which R is 2-thienylacetamido, $R^1$ is hydrogen, $R^2$ is acetoxy, $R^3$ is hydrogen, and $R^4$ is methyl.

\* \* \* \* \*

Notice of Adverse Decision in Interference

In Interference No. 99,516, involving Patent No. 3,923,795, D. O. Spry, 2-ALKOXYCEPHALOSPORINS, final judgment adverse to the patentee was rendered Aug. 10, 1977, as to claim 6.

[*Official Gazette December 20, 1977.*]